United States Patent
Cross

(10) Patent No.: US 7,371,327 B2
(45) Date of Patent: May 13, 2008

(54) DEVICE FOR THE IMMOBILIZATION OF NANO- AND MICRO-SIZED PARTICLES IN A SOLID-FLUID CONTACT VESSEL FACILITATING MASS-MOMENTUM, AND HEAT-TRANSPORT AT THE SOLID-FLUID INTERFACES

(76) Inventor: Kenneth Cross, 1220 Caminito Septimo, Cardiff, CA (US) 92007

( * ) Notice: Subject to any disclaimer, the term of this patent is extended or adjusted under 35 U.S.C. 154(b) by 200 days.

(21) Appl. No.: 11/210,449

(22) Filed: Aug. 25, 2005

(65) Prior Publication Data

US 2007/0280864 A1    Dec. 6, 2007

Related U.S. Application Data

(60) Provisional application No. 60/658,383, filed on Mar. 4, 2005.

(51) Int. Cl.
*B01D 35/06* (2006.01)
*B03C 1/02* (2006.01)

(52) U.S. Cl. .................. 210/695; 210/222; 210/223; 977/902; 422/186.01; 204/155; 204/557; 204/660; 204/664

(58) Field of Classification Search ............... 210/695, 210/222, 223; 977/902; 422/186.01; 204/155, 204/557, 660, 664
See application file for complete search history.

(56) References Cited

U.S. PATENT DOCUMENTS 4,309,290 A * 1/1982 Heitkamp ............... 210/695
4,352,730 A * 10/1982 Dijkhuis ................. 210/222

* cited by examiner

*Primary Examiner*—David A Reifsnyder
(74) *Attorney, Agent, or Firm*—Steven W. Webb

(57) ABSTRACT

What is presented is an innovative design of a chemical reactor for catalytic breakdown of halogenated hydrocarbons, the body of which acts as a specialized electromagnet capable of immobilizing and retaining very large quantities of non-magnetized ferro- dia- or para-magnetic material-containing nano, micro-, or milli-particles within it's reactor volume despite high-velocity flow of any liquid through said reactor. This is accomplished without any pre-treatment to the nanoparticles, without the use of adhesive of any sort, electroplating, electrolytic action, nano-structured nano-cages, membrane or other impregnation, or any other mechanical or chemical means.

10 Claims, 2 Drawing Sheets

DEVICE FOR THE IMMOBILIZATION OF NANO- AND MICRO-SIZED PARTICLES IN A SOLID-FLUID CONTACT VESSEL FACILITATING MASS-MOMENTUM, AND HEAT-TRANSPORT AT THE SOLID-FLUID INTERFACES

RELATED U.S. APPLICATIONS

This application supplements and completes Provisional Application 60/658,383, filed Mar. 4, 2005.

BACKGROUND OF THE INVENTION

Metallic nanoparticles (MNPs), which have at least one compositional constituent which is ferromagnetic, diamagnetic, or paramagnetic, have several extremely interesting and useful properties: their size, their structure, and in the case of bi- or multi-metallic nanoparticles, their junction voltage(s). Because they range from approximately 10 nanometers to 3 millimeters in characteristic dimension, usually mean effective diameter, regardless of their exact nanostructure or shape, the resulting ratio of the surface area to the mass of these particles is very high: one kilogram of 10 mm diameter catalytic particles has a surface area of approximately 600 cm2, while the same mass of 10-nm diameter nanoparticles will have a surface area of approximately 600 million cm2, a six-order of magnitude ratio. In catalysis, the reactants must each physically contact the surface of the catalyst in order to react, and the actual catalysis takes place on the surface of the catalytic species. Hence, this million-fold increase in surface area means that the potential rate of chemical reaction is one million times as great. Moreover, in the case of bi- or even multi-metallic MNPs, the rate of conversion attainable is also a function of the amount of bimetallic interface exposed to the reactant stream, and nanocatalysts have been developed which maximize this interfacial area on each nanoparticle, compounding the already huge catalytic advantage of nanocatalysis.

Now, by definition, a catalyst is different than a reactant. A catalyst facilitates a reaction but is neither created nor consumed by it. When one mole of reactant has reacted, the catalyst remains in it's original form, ready to facilitate another reaction, and so on ad infinitum.

Hence, besides size and structure, and often junction voltage, there is one further attribute which a good catalyst must have: It must stay in place in the reactor as the reactants move through and over its particles' surfaces, and not leave the discharge end reactor with the products. Now most often, standard catalyst particles are from 0.5 cm up to 5 cm in diameter, and are immobilized using one of two techniques: (1) the particles are attached—epoxied, glued, embedded, tack welded, or otherwise—to the surface of a stationary 'plate' of some sort, creating a 'fixed bed' over which the reactants then flow; or (2) the loose particles are simply packed between two screens in the reactor column and held in place by the screens themselves, creating a 'packed bed', over which the reactants then flow. In this latter configuration, it is the screens themselves which hold the particles from being entrained in the fluid flow, and hence the screens must be (a) strong, (b) resistant to corrosion/erosion by the reactants, products and conditions in the reactor, (c) must have a high percentage of open area to minimize the degree to which they impede flow through the reactor, and (d) must have openings which are significantly smaller than the catalytic particles themselves. Unfortunately, the minuscule size of nanoparticles, though having the advantages discussed above, also comes with an inherent disadvantage: it renders both of these immobilization technique types useless: Technique type (1) cannot fit enough nanoparticles in a small enough space to take advantage of the nanocatalysts' high surface area and always covers up a significant portion of the nanocatalyst particles' surfaces technique, further reducing its efficacy, while type (2) is impractical for any particles below about 1 mm, let alone nano-sized particles, especially considering requirements a, b, c, & d above.

BRIEF DESCRIPTION OF THE INVENTION

This invention, the High-Efficiency Nano-Catalyst Immobilization (HENCI) reactor, constitutes a new, novel, and completely unique way to immobilize or fix-in-place small chemical catalyst particles, including but not limited to MNPs, and comprises an apparatus and method for the immobilization or fixation of MNPs by building and configuring a chemical reactor to also be an electromagnet or a system permanent magnets, wherein the portion of the magnetic circuit which is open for work (the only portion of the magnetic circuit which is not occupied by/made of a solid mass, the portion of the circuit where the magnetic field is highly concentrated to serve the function of the device as in the open part of, say, a lifting electromagnet) is (1) also the chemical reaction zone within the magnet/reactor body, and (2) is packed with a high-surface-area, high-magnetic-permeability, woolen-structured matrix with a low specific flow-resistance (DelP/GPM/Axs/Unit reactor length) (hereafter HPMM).

This HPMM then, is located directly in the flow path and reaction zone of the reactor and constitutes an high magnetic-field-density portion or 'leg' of the magnetic circuit (where the lines of magnetic flux are close together). The HPMM, with its aforementioned woolen structure, is comprised up of many long intertwined fibers or strands as in the shape of steel wool, compressed together and thus in intermittent and intimate contact with each other.

Amorphous on a macro-scale, this woolen HPMM is comprised of individual strands acting individually on a micro scale, and the magnetic lines of flux are directed preferentially through the tortuous paths of the HPMM due to it's magnetic permeability being much greater than that of the process fluid. The magnetic flux lines, however, are not constrained to follow just one strand: when a strand's path brings it to one of the (many) points where it contacts another strand, the flux line will continue along whichever strand happens to be best aligned (axially) with the direction of the magnetic field at that point.

Now, imagine a section, dL, of one strand, which is short enough to be considered straight. In each of these sections, the strength of the magnetic field surrounding the strand decreases radially in the plane orthogonal to the axis of the strand section. Since the strength of this magnetic field decreases fastest right at the surface of each strand, the magnetic field gradient is greatest at the surface of each strand. For each section dL, then, there exists a cylindrical volume of very high magnetic field gradient of radius dR and length dL. Hence, integrated over the entire length of each strand and multiplied by the number of strands in one charge of the HPMM, the amount of volume in the reactor which now has a very high magnetic field gradient is (1) greatly multiplied and (2) dispersed evenly throughout the work area of the magnetic circuit/reaction zone of the reactor, such that the number of nanoparticles which can be held in place (immobilized) per unit reactor volume is high enough to take advantage of their ultra-high catalytic ability per unit nanomass. This is what renders HENCI unique, novel, and high-efficiency.

This invention is notable for not using zeolites, nanocages, binders, or adhesives to hold the catalyst particles onto the support matrix, relying instead on the unique configuration—an even dispersion of many high-gradient micro-volumes, collectively called a field tensor—of the magnetic field created by the combination of the HENCI magnet-reactor design and 'magnetic-core morphology' of the HPMM to hold a very high number of magnetic nanoparticles to the HPMM, and thus within the reactor body, at packing densities at least several orders of magnitude higher than any other technology, while exposing the entire, or nearly the entire surface area of each MNP to the reactant flow.

OBJECTS OF THE INVENTION

Accordingly, it is the principal object and advantage of this invention to immobilize ferro-, dia-, and paramagnetic particles and nanoparticles within a catalytic reactor without the use of adhesives, electroplating, electrodeposition, impregnation, nanocages, or zeolytes.

It is a further object of this invention to immobilize Mnps in the reactor (prevents them from being entrained in the flow of the reactant) without covering up any of their surface area, which would defeat the purpose of using them in the first place.

It is a further object of this invention that the magnetic field be created and sustained by either permanent magnets or electromagnet.

Hence the scope of this invention encompasses two fundamental reactor design types: that utilize a permanent magnetic field (hereafter 'PM Reactor'), and that utilizing an electromagnetic field (hereafter "EM Reactor").

BRIEF DESCRIPTION OF THE DRAWINGS

The construction and operation of the invention can be readily appreciated from inspection of the drawing that accompanies this application.

DETAILED DESCRIPTION OF THE INVENTION

Figure 1:
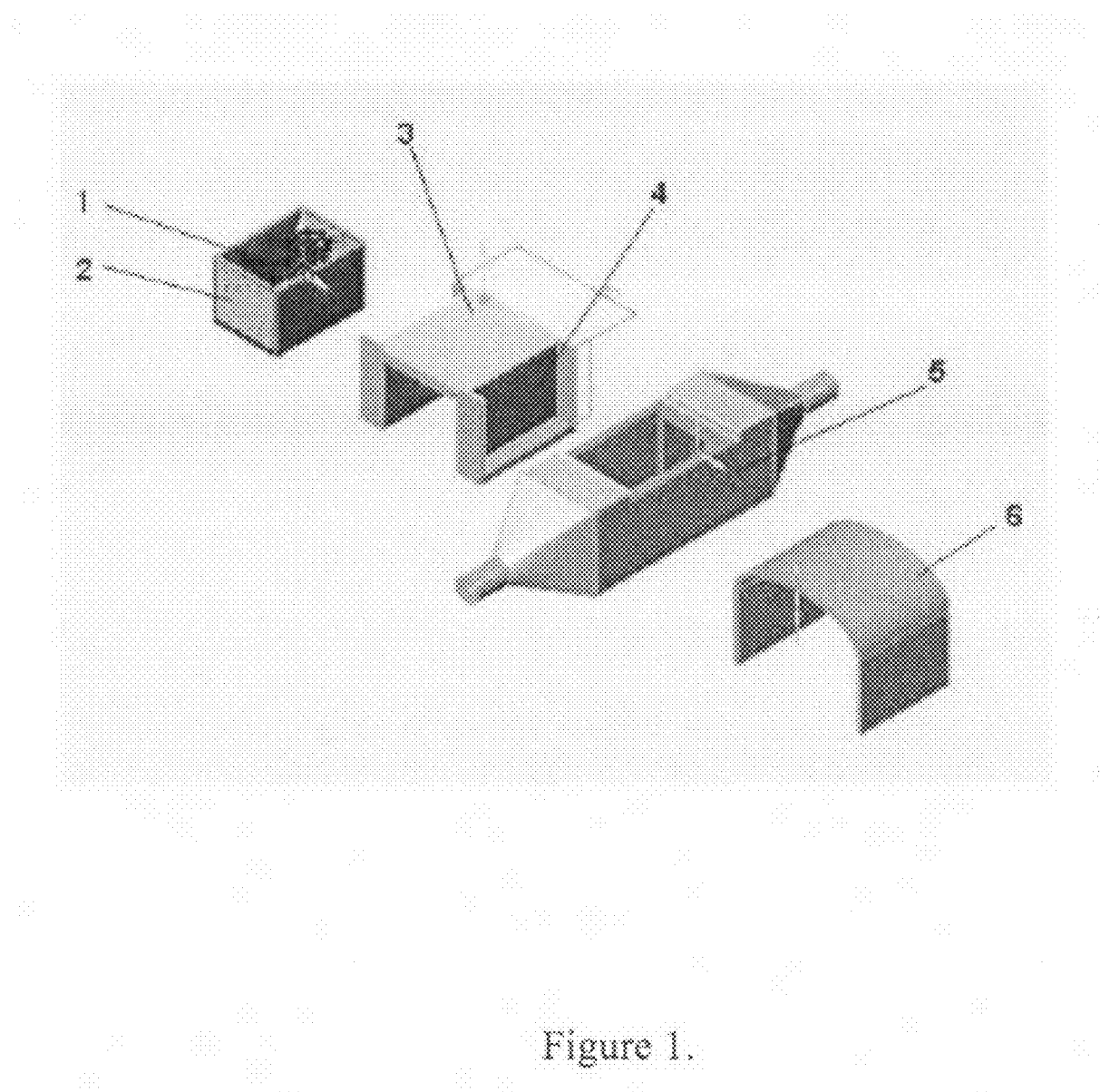
FIG. 1 is an exploded view of the PM reactor.

The preferred design of the PM reactor is depicted in FIG. 1. The high-permeability matrix (1) is loaded into the reactor basket (2), which is sealed into the reactor body using sealing lid (3). Two face-pole magnets (4) are then placed abreast of the main section of the reactor body (5) with their 'North' poles facing in the same direction. Note that, in this design, the lines of magnetic flux between the two inner facing poles of the magnet will be parallel and of nearly constant density within the boundary of the magnet faces. Note also that the area of each magnet pole-face (normal to the lines of flux) is approximately equal to the side face of the reactor basket. To increase the strength of the magnetic field between the two magnets, a metallic or otherwise high-magnetic permeability magnetic 'bridge' (6) can be lowered onto and over the outside of both magnets, creating, in effect, one 'U' shaped magnet with the 'open' section between the face-poles of the magnets. Hence all the flux lines will be subject to the aforementioned action of the HPMM woolen matrix: they will preferentially follow the highly-tortuous paths of the matrix' wool itself, thus creating the very large areas of high magnetic-flux gradient responsible for the ultra-high density of MNPs which are immobilized within the reactor volume.

Note that this design allows the basket, HPMM, and attached MNPs to be removed for service or inspection without releasing the MNPs into the discharge stream. Note also that, should the reactor be designed for swing-batch operation, the ability to remove just the magnets (with the bridge in one unit) allows one to release the MNPs from the matrix at will, should a new charge of MNPs be required.

Figure 2:
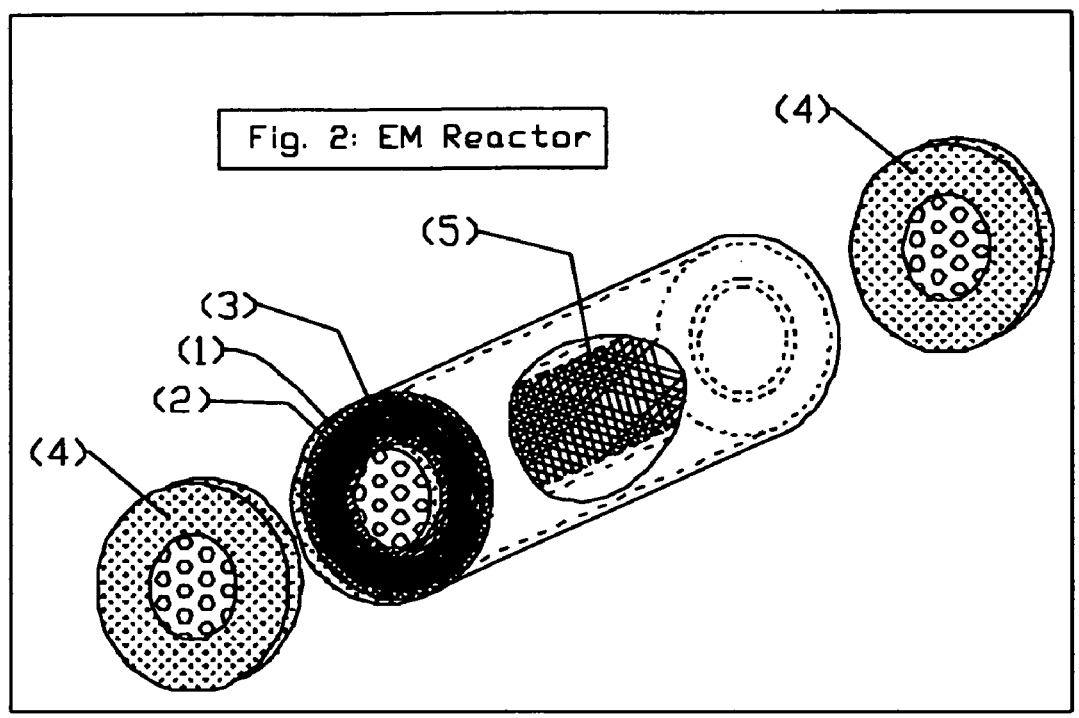
FIG. 2 is an exploded view of the EM reactor.

The design of the EM reactor is depicted in FIG. 2. This is a tubular reactor which can be positioned in any orientation, though chemical processing considerations may often render it optimal to employ the reactor such that it's axis lies in a vertical or horizontal plane. Referring to FIG. 2 then, the reactors tubular wall (1) is made of a non-conducting (low-permeability) material. Its outer surface is used as a mandrel for the necessary wire windings (2) which, when energized by a power source which outputs either DC current or a hybrid AC/DC current whose amplitude never falls to or below zero, create an elongated toroidal-shaped magnetic field whose axis is co-linear with the main reactor body. The windings are then covered or 'sheathed' by a ferromagnetic 'sheath' tube (3) which serves to efficiently conduct the magnetic lines of flux through the outer portion of the aforementioned toroidal field. The 'endcaps' of the EM-reactor (4) contain one or more Ferro, dia, or paramagnetic materials which serve to efficiently conduct the magnetic lines of flux radially through the end-portions of the aforementioned toroidal field. The endcaps or 'endplates' are machined to have a 'screen' or 'grid' in their center, of diameter similar to the inside diameter of the reactor tube/wall (3), such that they can still conduct the lines of flux to and from the core matrix material while also allowing the reactant fluid to flow into, and the reaction products to flow out of, the EM reactor body. In this way, the efficiency (overall or "loop" permittivity) of the magnet is maximized, the HPMM is held in place by the grid or continuous metal paths machined into of the screen/grid of each 'endcap', and the process fluid is simultaneously allowed to flow through the reactor body. The endcaps or 'endplates' can also act as flange gaskets to facilitate connection of the reactor to the process piping or tubing, while allowing fluid flow through their openings, perforations, or screen, which is in intimate contact with both the HPMM and the high-permeability outer sheath of the magnet-reactor. Note that simply de-energizing the electromagnet without halting the fluid flow through the reactor allows one to release the MNPs from the HPMM at will, should a new charge of MNP's, or new HPMM be required for any reason (due to failure of upstream systems, etc.). This option could, of course be facilitated using a dual-EM-reactor (parallel operation swing-batch) design, in which, by the use of isolation valves, one of the EM reactors could be brought 'off-line' and put into a 'flush circuit'. This is standard Chemical Process Industry practice for continuous reactors and allows service or repair of one unit while the second unit takes over without interrupting the overall operation.

Additionally, note that the entire BPMM/MNP combination can be cathodically protected, by connecting a cathodic lead to the outer sheath of the HENCI EM reactor or the magnetic bridge of the PM reactor min a manner similar to that used for underground piping, etc., to increase the longevity of the least-noble metal in the nanocatalyst particles AND in the HPMM, having the non-obvious advantage of further preserving the catalyst itself from galvanic or other corrosive attack.

There are several additional unique aspects to this invention:

1. No binder, coating, adhesive, any or other materials are required to immobilize the MNPs.

2. The immobilized MNPs can be as small as can be manufactured (currently down to about 20 nm effective diameter but there is no lower limit on the size of particles supported by HENCI) and up to 5 mm in effective diameter 3. MNPs are held in place solely by high gradients in a magnetic field the vector quantity of which may change value with time, but does not change direction.

4. Magnetic field strength gradients are created by a) concentrating the flux lines in the reaction zone, and b) exploiting the difference in magnetic permeability of the HPMM versus that of the reactant stream.

5. The highly dispersed morphology of the magnetic field gradient, being split up into a very large number of contiguous micro-gradient areas is also responsible HENCI reactors' capacity to immobilize ultra-high numbers of MNPs within a small space without causing excessive pressure drop during continuous-flow operation.

6. MNPs are not magnetized prior to use.

7. MNPs need not be magnetized during use: the magnetic field is either designed to be (PM reactor) or adjusted to be (EM reactor) just strong enough to hold the MNPs in place during flow through operation, such that they are magnetized as little as physically possible during use, and can thus be released at will form the HPMM by removing (PM)/de-energizing (EM) the magnetic field, and otherwise handled as described in the detailed descriptions of the reactors above.

8. If process considerations (e.g. long runs, high flows, etc) dictate that the magnetic field strength and time of exposure render the MNPs slightly magnetized after use, and a less-than-satisfactory percentage of catalytic particles emerge from the HENCI reactor after removal/de-energizing of the Magnetic field, the entire slug of (low-cost) HPMM is simply replaced, some new MNPs are added to make up for those which adhered to the old HPMM, and the reactor is recharged 9. Although normal steel wools, stainless steel wools, special alloy stainless steel wools, including low Ni stainless steel, as well as other rare-earth elements and alloys, can be used as the HPMM material, any material with a magnetic-permeability significantly higher than the carrier fluid can theoretically be employed successfully for the woolen matrix.

10. The woolen matrix becomes part of the magnetic field circuit.

11. In the EM, wool comprises the 'core' which runs through the electromagnet axis, and in the PM, the wool lies directly between two poles the line between whose centers intersects (or nearly intersects) and is perpendicular to the axis of flow 12. In the EM Design, the inlet and outlet 'planes' of the reactor facilitate the high-permittivity conduction of magnetic field lines by virtue of the fact that they include a continuous metallic 'circuit' or path across the plane of the reactor face, accomplished by machining a grid into the 'endcaps' of the electromagnet. This allows fluid flow through the reactor while also affording a high-permeability path for the magnetic flux to travel from the iron (outer) sheath radially inward (and outward on the other end of the reactor) to/from/and through the specialized 'core' of the reactor, which contains the high surface area matrix onto which the particles are immobilized, without a non-metallic gap in the magnetic circuit.

13. Operationally, the HPMM is pre-loaded into the reactor (open) core/reaction zone, the reactor flanges are then replaced, the reactor is then connected to an inlet and outlet conduit. For enabling the system, the inlet and outlet are connected to a reservoir, which has a pump connected to the reactor inlet tube. The pump is energized and the carrier fluid is then cycled through the reactor in a closed loop. The MNPs are then added to the reservoir and become homogeneously dispersed in the fluid. Within minutes, the fluid has carried all the MNPs into the HENCI reactor, where they have been immobilized in the HPMM, as evidenced by the clarity of the carrier fluid exiting the reactor. At this point, the inlet tube is connected to the reactant source, and the catalysis and reaction take place continuously producing a discharge stream rich in reaction product.

While the preferred embodiment of the invention has been described, modifications can be made and other embodiments of this invention realized without departing from the intent and scope of any claims associated with this invention.

The invention claimed is:

1. What is claimed is a permanent magnetic field reactor comprised of a high-permeability metallic matrix, a reactor basket, a reactor body, a permanent magnet configuration, the high-permeability magnetic matrix comprised of any high permeability metal, the high permeability metallic matrix in the shape of steel wool, with many interwoven fibers, the permanent magnet configuration resulting in high-density magnetic flux lines within the reactor body, The high permeability metallic matrix capable of being magnetized by a linear magnetic field provided by the permanent magnet configuration, the flux lines of the magnetic field forced to follow the winds and turns of the steel wool shape because of the permeability of the high-permeability metallic matrix, creating many areas of relatively high magnetic-flux gradient next to the surface of the metallic matrix, with the vector of the magnetic-flux gradient perpendicular to the surface of the matrix at all points, the metallic matrix covered with a plurality of metallic nanoparticles, the metallic nanoparticles having catalytic properties, the metallic nanoparticles being held to the surface of the steel wool shape of the metallic matrix by means of the strong localized relative gradient of the magnetic field emanating from the metallic matrix distributed throughout the volume formed by the high permeability metallic matrix, the metallic matrix fixedly positioned within the reactor basket, the reactor basket small enough to fit within the reactor body, the reactor body in a shape such that reactant can flow into one end of the reactor and exit the other end, the reactor body sealed so that the fluid reactant flowing through the reactor does not escape, the combination of the magnetic field, the high-permeability magnetic matrix, and the metallic nanoparticles such that the metallic nanoparticles do not leave the metallic matrix and join the reactant flow, the reactor basket removable from the reactor and the metallic nanoparticles replaceable by removing the reactor basket from within the magnetic bridge and then flushing the used metallic nanoparticles from the woolen matrix.

2. The permanent magnetic field reactor of claim 1 where the permanent magnet configuration is comprised of a magnetic bridge holding two flat face pole magnets in such a manner that the North poles of the magnets are pointing in the same direction, the magnets held in the bridge such that they are parallel to each other on opposite sides of the magnetic bridge.

3. The permanent magnetic field reactor of claim 1 where the reactor is cathodically protected, by connecting a cathodic lead to the magnetic bridge and attaching the cathodic lead to a steady voltage source.

4. An electromagnetic reactor comprised of a tube functioning both as a reactor body and as a mandrill, a set of windings of electro-conductive material, a high-magnetic-permeability sheath tube, a high-magnetic-permeability metallic end cap at each end of the mandrill, the mandrill wrapped cylindrically by the windings of conductive material, the sheath tube cylindrical in shape and large enough to enclose the mandrill with the conductive material wrapped around the mandrill, the conductive windings powered by a current source, the current source and windings producing a toroidal electromagnetic field around and within the mandrill whose direction within the mandrill is parallel with the long axis of the mandrill, the sheath containing and concentrating the magnetic field, the interior of the mandrill hollow and housing a high-permeability metallic matrix in the shape of steel wool, the high permeability metallic matrix capable of preferentially conducting the magnetic field provided by the inventions electro-conductive windings and power source, the flux lines of the magnetic field forced to follow the winds and turns of the steel wool shape because of the permeability of the high-permeability metallic matrix, creating many areas of relatively high magnetic-flux gradient next to the surface of the metallic matrix, with the vector of the magnetic-flux gradient perpendicular to the surface of the matrix at all points, the metallic matrix covered with a plurality of metallic nanoparticles, the metallic nanoparticles having catalytic properties, the metallic nanoparticles being held to the surface of the steel wool shape of the metallic matrix by means of the strong relative gradient of the magnetic field emanating from the metallic matrix, the end caps at each end of the mandrill porous or made of metallic mesh, the material of the end caps forming a part of the magnetic circuit, the end caps able to permit the flow of reactant fluid through the mandrill such that the reactant can be acted upon by the catalytic properties of the metallic nanoparticles.

5. The electromagnetic reactor of claim 4 where the power source is optionally fluctuating in current amplitude, the direction of current always remaining the same, the strength of the current optionally reaching zero, the effect of said fluctuating power source to disturb the plurality of metallic nanoparticles clinging to the high permeability metallic matrix such that the plurality of metallic nanoparticles physically vibrate and optionally detach momentarily from the high permeability metallic matrix, subsequently reattaching themselves.

6. The electromagnetic reactor of claim 4 where the reactor is cathodically protected, by connecting a cathodic lead to the sheath tube and attaching the cathodic lead to a steady voltage source.

7. The electromagnetic reactor of claim 4 where the reactor body tube possesses perfect radial symmetry throughout its length conducive to a negligible boundary slip-layer effect and where the high-permeability metallic matrix produces a fully developed turbulent flow profile within the reactant fluid.

8. The electromagnetic reactor of claim 4 where the current source is continuously adjustable in a range of current values.

9. The electromagnetic reactor of claim 4 where the overall length of the sheath is at least three times the diameter of the interior dimension of the sheath.

10. A method of using an electromagnetic reactor as in claim 4 comprised of the steps of mixing a suspension of particles in a volume of carrier fluid contained within a sump, the carrier fluid comprised of water or any-non aqueous solvent, the particles comprised of metallic nanoparticles, using as much carrier fluid as is needed to fill the electromagnetic reactor and immobilization loop, and leave enough carrier fluid in the sump to submerge the pump intake, setting the electromagnetic reactor inlet and discharge valves such that the suspension is routed back to the sump after being pumped through the reactor, agitating the mixture to suspend the particles within the sump, placing the sump under the immobilization pump intake, routing the electromagnetic reactor discharge back into the sump, turning on the pump and pumping the suspension through the electromagnetic reactor with a fluid linear velocity sufficient to keep the metallic nanoparticles suspended in the carrier fluid, after the sump level is constant with time, turning up the power supply unit to approximately 95% of the predetermined immobilizing force necessary to fully immobilize the specific nanoparticles for the desired application, slowly increasing the immobilizing force to 105%-120% of the force necessary for complete immobilization of the nanoparticles, noting the suspension in the sump becoming 'clear' of the nanoparticles as the nanoparticles are captured onto the surface of the steel wool of the electromagnetic reactor, when the suspension in the sump becomes clear, setting the electromagnetic reactor to 'catalysis' mode, turning off the immobilization pump, letting the suspension drain back into the sump, turning the electromagnetic reactor inlet and discharge valves back to 'catalysis' orientations to allow reactant to flow through the electromagnetic reactor.

* * * * *